United States Patent [19]

Nagata et al.

[11] Patent Number: 4,787,044

[45] Date of Patent: Nov. 22, 1988

[54] APPARATUS AND METHOD FOR CONTROLLING ROTATIONAL SPEED OF INTERNAL COMBUSTION ENGINE FOR VEHICLES

[75] Inventors: Tosirou Nagata, Kariya; Fumiaki Murayama; Mikio Kumano, both of Anjo; Michitaka Terasawa, Tokyo; Hideo Nagakura, Tokyo; Masaru Idoguchi, Tokyo, all of Japan

[73] Assignees: Nippondenso Co., Ltd., Kariya; Hino Motors, Ltd., Tokyo, both of Japan

[21] Appl. No.: 755,435

[22] Filed: Jul. 16, 1985

[30] Foreign Application Priority Data

Jul. 17, 1984 [JP] Japan .................. 59-149097

[51] Int. Cl.[4] .......................... F02D 31/00; F02D 9/06
[52] U.S. Cl. ................. 364/431.07; 123/323; 123/339
[58] Field of Search ............. 364/431.03, 431.04, 364/431.07; 73/116; 123/339, 323

[56] References Cited

U.S. PATENT DOCUMENTS

| | | | |
|---|---|---|---|
| 4,106,584 | 8/1978 | Matsubara | 180/105 E |
| 4,266,447 | 5/1981 | Heess et al. | 74/858 |
| 4,267,807 | 5/1981 | Ashfield | 123/323 |
| 4,291,656 | 9/1981 | Miyagi et al. | 123/339 |
| 4,370,903 | 2/1983 | Stroh et al. | 74/858 |
| 4,381,746 | 5/1983 | Miyagi et al. | 123/339 |
| 4,401,073 | 8/1983 | Furuhashi | 123/339 |
| 4,432,317 | 2/1984 | Kawamura | 123/339 |
| 4,443,852 | 4/1984 | Kobayaski et al. | 364/431.03 |
| 4,453,518 | 6/1984 | Nakamura et al. | 123/339 |
| 4,454,853 | 6/1984 | Hasegawa | 364/431.04 |
| 4,506,770 | 3/1985 | Schmid | 123/339 |
| 4,553,648 | 11/1985 | Suzuki et al. | 123/323 |
| 4,555,762 | 11/1985 | Ohgami et al. | 123/339 |
| 4,556,027 | 12/1985 | Harris | 123/323 |
| 4,572,125 | 2/1986 | Kratt | 123/339 |
| 4,580,221 | 4/1986 | Isobe et al. | 364/431.05 |
| 4,603,668 | 8/1986 | Ueno | 123/352 |
| 4,639,870 | 1/1987 | Otobe et al. | 364/431.04 |
| 4,665,692 | 5/1987 | Inaba | 123/323 |
| 4,669,435 | 6/1987 | Furusawa et al. | 123/323 |

FOREIGN PATENT DOCUMENTS 56-101031 8/1981 Japan .
57-140531 8/1982 Japan .

Primary Examiner—Parshotam S. Lall
Assistant Examiner—V. N. Trans
Attorney, Agent, or Firm—Cushman, Darby & Cushman

[57] ABSTRACT

Engine speed is controlled during gear change by way of both fuel supply apparatus and exhaust brake so that engine speed is equal to the rotational speed of an input shaft of a transmission coupled via a clutch to the engine. When the engine speed is higher than the rotational speed of the transmission input shaft, exhaust braking is performed to quickly reduce the engine speed thereby establishing synchronization. Then the fuel supply apparatus is controlled to reduce the amount of fuel for maintaining the decreased engine speed. On the other hand, when the engine speed is lower than the rotational speed of said transmission input shaft, only the fuel supply apparatus is controlled to increase the fuel amount. Engine braking is performed only when the clutch is in disconnected state, and therefore, vehicle speed is not decelerated due to the engine braking.

8 Claims, 4 Drawing Sheets

APPARATUS AND METHOD FOR CONTROLLING ROTATIONAL SPEED OF INTERNAL COMBUSTION ENGINE FOR VEHICLES

BACKGROUND OF THE INVENTION

This invention relates generally to apparatus for controlling rotational speed of an internal combustion engine used for vehicles, such as automobiles, and particularly to such apparatus used with rotational force transmitting system including a clutch and a transmission.

In the operation of an internal combustion engine used for a motor vehicle, if the rotational speed of a clutch at its engine side is not equal to the rotational speed of the clutch at its transmission side during gear change performed when the motor vehicle is driven, undesireable phenonmena, such as acceleration or deceleration shock, torsion of the propeller shaft, wear of the clutch, are apt to occur at the time of engagement of the clutch. These undesirable phenonmena would deteriorate smooth and stable travelling of the motor vehicle and cause mechanical damages or deterioration of the clutch, propeller shaft and other parts.

This problem may be resolved if the rotational speed of the clutch disc at its engine side is controlled to be equal to the rotational speed of the other clutch disc at its transmission side, namely the engine speed equals the rotational speed of an input shaft of the transmission. According to a conventional apparatus, such as disclosed in a Japanese patent provisional publication No. 57-140531, the engine speed is controlled to be equal to a target speed which is obtained in accordance with engine load. However, with such conventional apparatus, the above-mentioned problems are not effectively resolved, and therefore, vehicle drivers have hitherto been required to be skillful enough in connection with the operation of the accelerator pedal and the clutch pedal to avoide possible damages of the clutch and its peripheral parts and to provide smooth transmission of rotational force from the engine to the propeller shaft.

SUMMARY OF THE INVENTION

The present invention has been developed in order to remove the above-described drawbacks inherent to the conventional apparatus for controlling engine speed during gear change.

It is, therefore, an object of the present invention to provide a new and useful apparatus for cotrolling engine speed during gear change so that engine speed immediately equals the rotational speed of an input shaft of the transmission thereby reducing acceleration and deceleration shock occuring on gear change irrespective of the operating skill of the driver and suppressing the mechanical damages of the clutch discs, propeller shaft and so on.

According to a feature of the present invention engine speed is controlled during gear change by way of both fuel supply apparatus and exhaust brake so that engine speed is equal to the rotational speed of the input shaft of the transmission couped via a clutch to the engine. When the engine speed is higher than the rotational speed of the transmission input shaft, exhaust braking is performed to quickly reduce the engine speed thereby establishing synchronization. Then the fuel supply apparatus is controlled to reduce the amount of fuel for maintaining the decreased engine speed. On the other hand, when the engine speed is lower than the rotational speed of said transmission input shaft, only the fuel supply apparatus is controlled to increase the fuel amount. Engine braking is performed only when the clutch is in disconnected state, and therefore, vehicle speed is not decelerated due to the engine braking. Since clutch connection can be performed with the engine speed being controlled to be synchronized with the rotational speed of the transmission input shaft, undesirable acceleration and deceleration shock is suppressed, while the clutch, the propeller shaft and their peripheral parts are prevented from receiving undesirable strong stress thereby avoiding the torsion of the propeller shaft and the deterioration of these parts.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
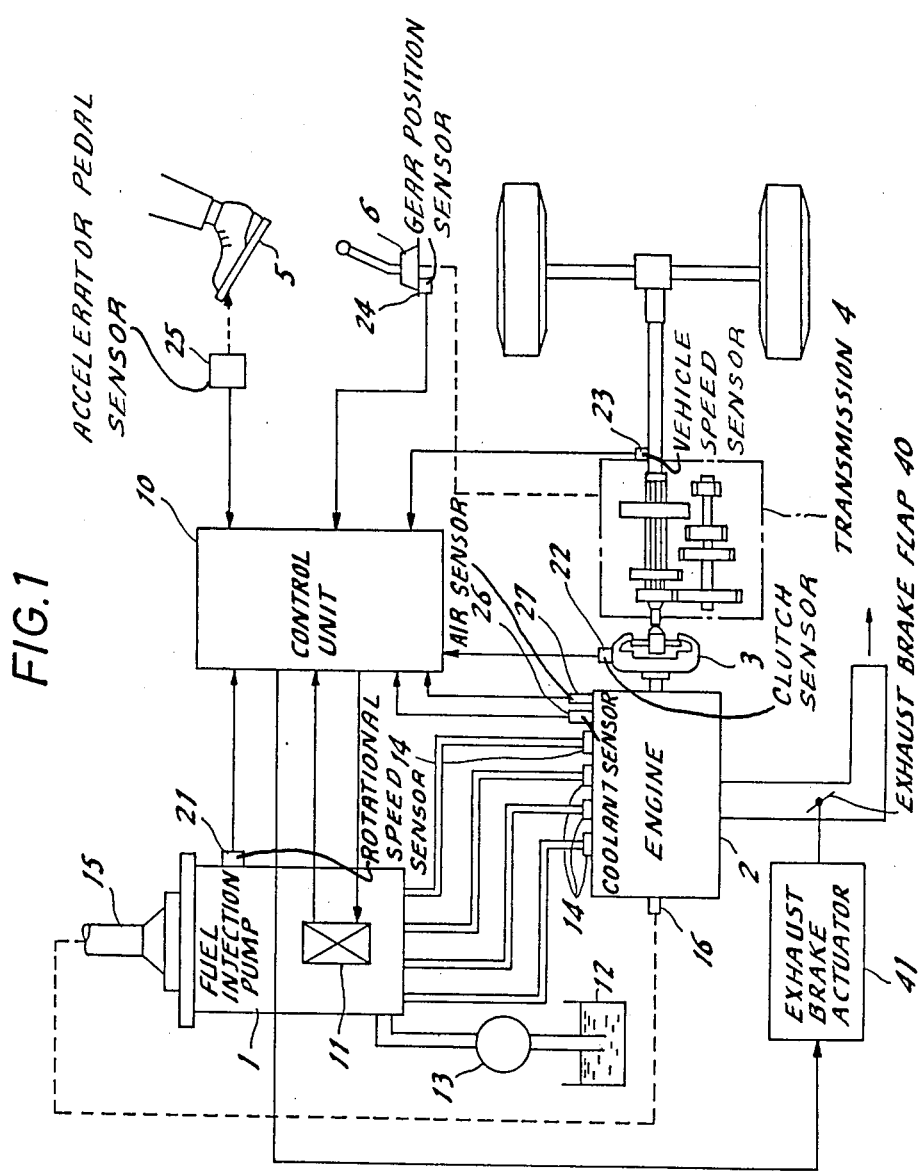
FIG. 1 is a schematic diagram showing an embodiment of the apparatus for controlling engine speed according to the present invention.

Referring now to FIG. 1, a schematic diagram of an embodiment of the apparatus according to the present invention is shown. The embodiment will be described taking an example in which the apparatus according to the present invention is adapted to a diesel engine of an automobile. A diesel engine 2, which is simply referred to as engine hereinafter, mounted on an unshown motor vehicle is arranged to be speed controlled by way of the amount of fuel supplied via fuel injection valves 14 and by way of an exhaust brake flap 40 installed in an exhaust pipe.

In FIG. 1, a fuel injection pump 1 is arranged to supply the fuel injection valves 14 with fuel which is fed via a feed pump 13 from a fuel tank 12. Indicated at the reference 3 is a clutch interposed between the engine crankshaft and a transmission 4 coupled with the propeller shaft of the vehicle. The reference 5 is an accelerator pedal, and the reference 6 is a gear-shift lever. An electronic control unit 10 is provided to control the engine speed using various detection signals from various sensors. More specifically, the amount of fuel injected via the fuel pump 1 is computed and controlled by the electronic control unit 10, while an exhaust brake actuator 41 associated with the exhaust brake flap 40 is controlled by the electronic control unit 10. The fuel injection pump 1 comprises a fuel metering actuator 11 arranged to be controlled by the electronic control unit 10 so that the amount of fuel fed to the fuel injection valves 14 is controlled. A drive shaft 15 of the fuel injection pump 1 is mechanically coupled with engine crankshaft to be synchronous with engine rotation. A rotational speed sensor 21 is attached to the fuel injection pump 1 for detecting the rotational speed Ne of the engine 2.

A clutch sensor 22 is shown to be attached to the clutch 3 for detecting connecting or disconnecting state of the clutch 3. The clutch sensor 22 may be associated with an unshown clutch pedal instead of being attached to the clutch 3 per se. A vehicle speed sensor 23 is attached to an output shaft of the transmission 4 for detecting the travelling speed of the vehicle. A gear position sensor 24 is associated with the gear-shift lever 6 for detecting the gear position in the transmission 4. An accelerator sensor 25 is associated with the accelerator pedal 5 for detecting the depressing state of the accelerator pedal 5. These sensors 21 through 25 are arranged to produce output signals representing detected states so as to supply the electronic control unit 10 with various detection signals.

A coolant temperature sensor 26 for detecting engine coolant temperature as well as an intake air temperature sensor 27 for detecting intake air temperature is provided to the engine 10 and detection signals therefrom are arranged to be fed to the electronic control unit 10. In addition, further signals, such as an ON-OFF signal of an unshown air-conditioner of the vehicle, are fed to the electronic control unit 10. These signals from the coolant temperature sensor 26 and the intake air temperature sensors 27 as well as the air-conditioner ON-OFF signal are used as parameters for increasing the amount of fuel during warming up and high-load operation of the engine 2.

The fuel metering actuator 11 within the fuel injection pump 1 is equipped with a sensor (not shown) for detecting the operating state thereof. This detection signal from the sensor of the fuel metering actuator 11 is also fed to the electronic control unit 10 so that an actuator drive signal is fed from the control unit 10 to the fuel metering actuator 11 for supplying a desired amount of fuel to the engine 1 on the basis of the detection signals from the various sensors.

Figure 2:
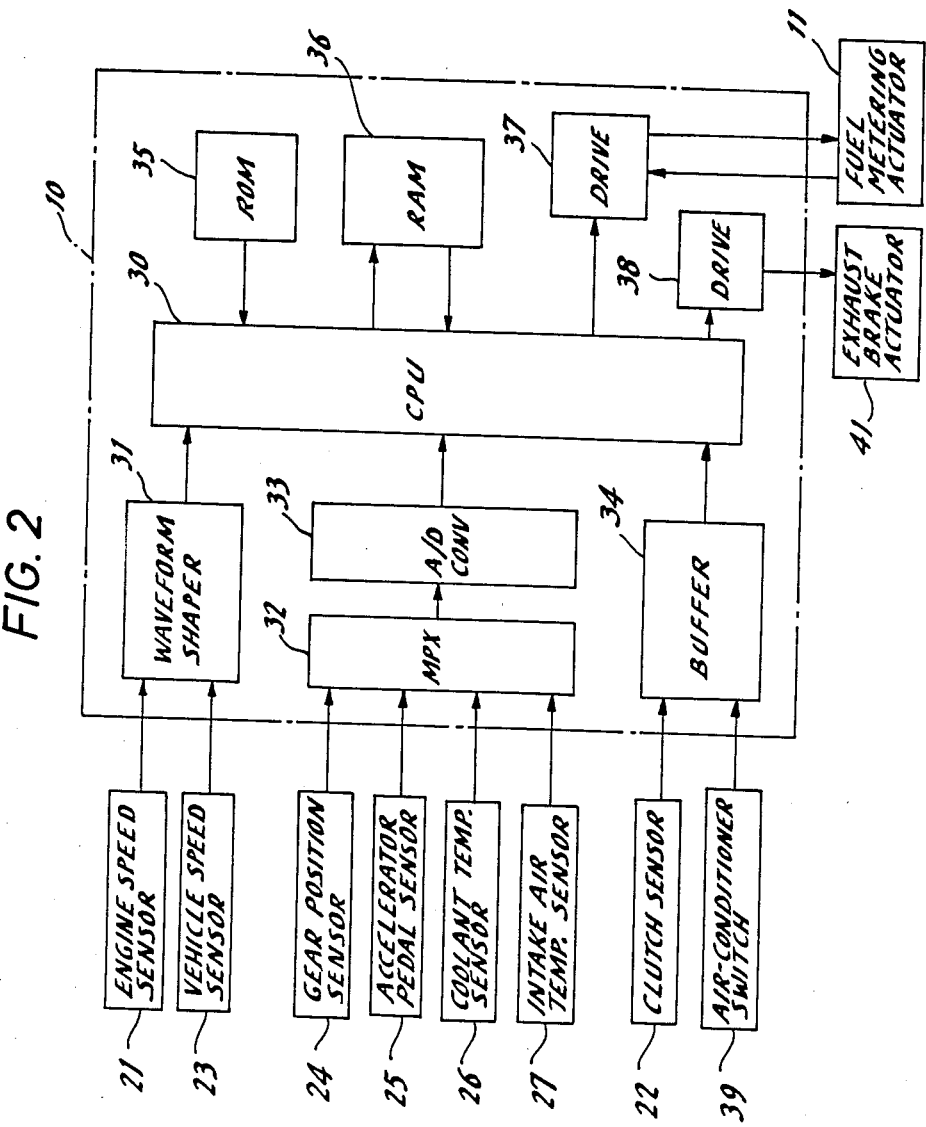
FIG. 2 is a schematic block diagram showing an electronic control unit used in the apparatus of FIG. 1.

FIG. 2 shows a schematic block diagram of the electronic control unit 10 shown in FIG. 1. The control unit 10 comprises a computer having a contral processing unit (CPU) 30 and memories such as a ROM 35 and a RAM 36. In addition to the computer, the control unit 10 also comprises a waveform shaper 31 responsive to detection signals from the engine speed sensor 21 and the vehicle speed sensor 23, an analog multiplexer 32 responsive to detections signals from the gear-position sensor 24, the accelerator pedal sensor 25, the coolant temperature sensor 26, and the intake air temperature sensor 27, an A/D converter responsive to an output signal from the analog multiplexer 32, a buffer circuit 34 responsive to a detection signal from the clutch sensor 22 and to the air-conditioner ON-OFF signal from an air-conditioner switch 39, and first and second drive circuits 37 and 38 for respectively driving the actuators 11 and 41.

The waveform shaper 31 shapes the detection signals representing engine speed Ne and vehicle speed respectively to produce pulse waveforms which are inputted to the CPU 30. The detection signals, which are analog signals, from the sensors 24 through 27 are selected in sequence by the multiplexer 32 to be converted into a digital signal by the A/D converter 33, and thus the resulted digital data are fed to the CPU 30. The clutch connection-disconnetion signal, air conditioner ON-OFF signal and other signals are fed via the buffer 34 to the CPU 30.

A control program for computing amount of fuel to be injected, which program will be described hereinlater, and predetermined pattern data are stored in the ROM 36 in advance. The CPU 30 computes the amount of fuel to be injected in accordance with the control program and data stored in the ROM 35 using other data temporarily stored in the RAM 36. Furthermore, the CPU 30 also determines the opening and closure of the exhaust brake flap 40 similarly. As a result, the CPU 30 supplies the drive circuits 37 and 38 respectively with a signal representing the position of the fuel metering actuator 11 corresponding to the amount of injection and an open-close signal of the exhaust brake actuator 41. The drive circuit 37 sends a drive signal to the fuel metering actuator 11 so that the signal from the sensor detecting the operating state of the fuel metering actuator 11 equals the position signal from the CPU 30 thereby a desired amount of fuel is injected from the fuel injection pump 1.

Figure 3:
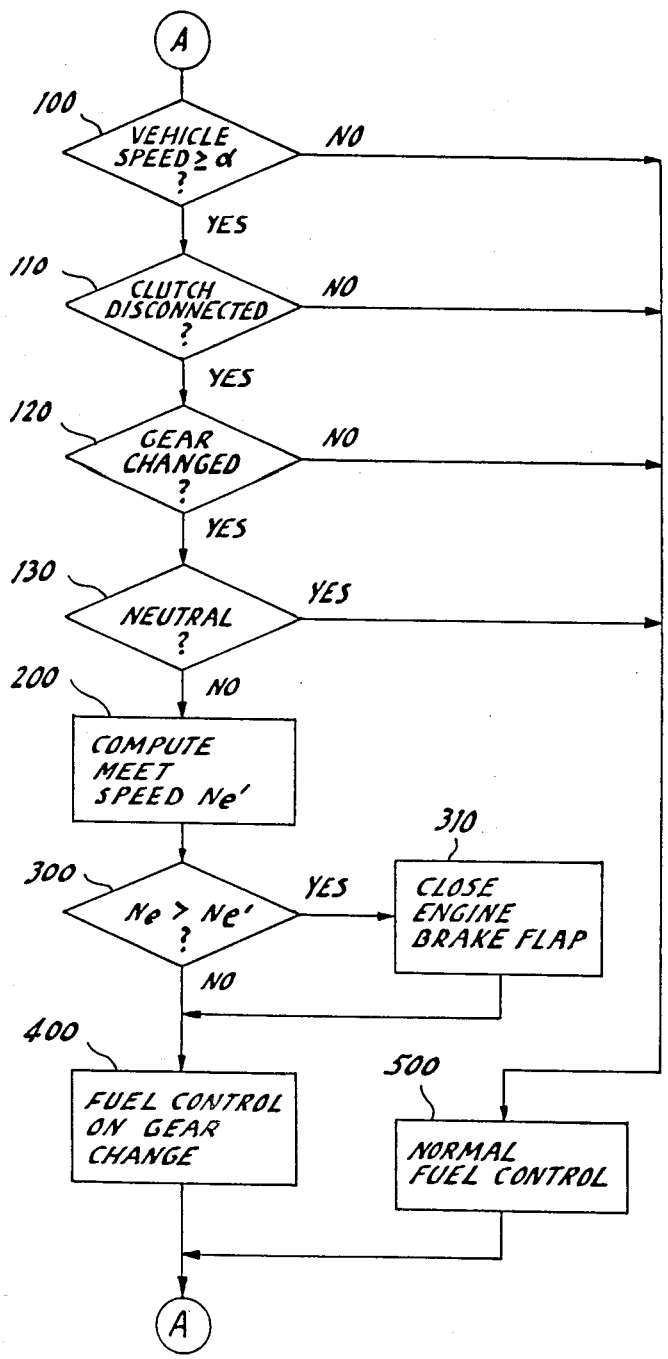
FIG. 3 is a flowchart showing prorgrammed operations to be executed by a computer included in the electronic control unit shown in FIG. 2.

The operation of the computer will be further described in detail with reference to a flowchart of FIG. 3 showing the control program for the CPU 30. This control program is arranged to be executed once in a main routine for instance.

In a first step 100, it is checked whether the vehicle speed represented by the detection signal from the vehicle speed sensor 23 is greater than or equal to a predetermined value $\alpha$. If the vehicle speed is greater than or equal to the predetermined value $\alpha$, it is checked in a step 110 whether the transmission is in gear-changing state or not on the basis of the connection-disconnection signal from the clutch sensor 22. In the case of disconnecting state of the clutch 3, the gear position is detected in a step 120 using the detection signal from the gear position sensor 24. Using a detected gear position, it is checked whether the present gear position differs from a gear position of a former cycle of the processing. When it is determined that the gear position has been changed, it is checked whether the gear position is neutral or not in a step 130. In this embodiment, when the gear position is changed to neutral, a former gear position prior to the change is stored.

In the case that the gear position is other than neutral, the rotational speed, which is referred to as meet speed Ne' hereinafter, of the clutch disc at its vehicle wheel side is computed, in a step 200, using obtained vehicle speed and gear position representing gear ratio between the clutch 3 and the wheel. The above-mentioned meet speed Ne' equals the rotational speed of an input shaft of the transmission 4 interposed between the clutch 3 and the propeller shaft. In order to match the engine speed to this meet speed Ne', the fuel metering actuator 11 and the exhaust brake actuator 41 will be used.

The engine speed Ne is controlled to be equal to the meet speed Ne' as follows. In a step 300, the engine speed Ne is compared with the meet speed Ne'. If the engine speed Ne is greater than the meet speed Ne', a step 310 is executed to produce an instruction with which the exhaust brake actuator 41 is operated to close the exhaust brake flap 40 until the engine speed Ne is reduced to the meet speed Ne' for instance. As a result, the engine speed Ne equals the meet speed Ne' quickly.

Figure 5:
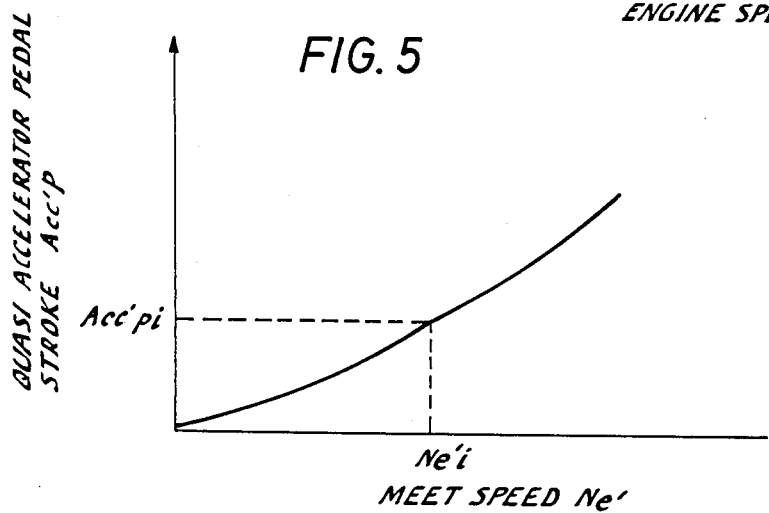
Figure 6:
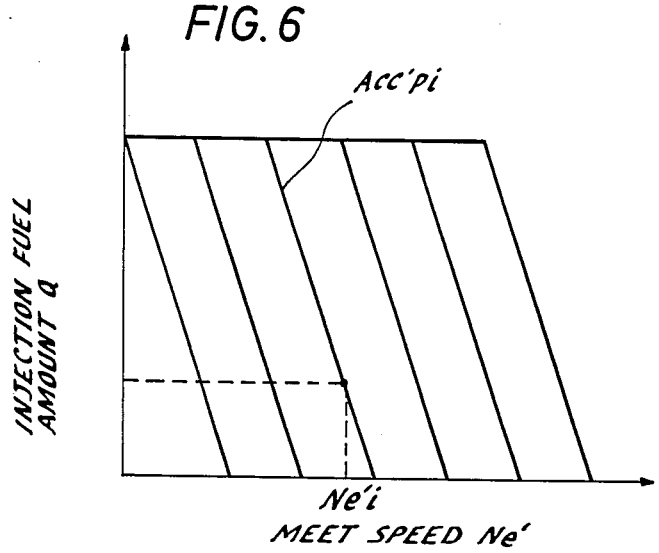

In a following step 400, a quasi amount or stroke of the accelerator pedal for obtaining an engine speed Ne corresponding to the meet speed Ne' is obtained. The quasi amount or stroke Acc'p of the accelerator pedal may be derived from a two-dimentional map stored in the ROM 35. One example of the relationship between meet speed Ne and quasi stroke Acc'p of accelerator pedal is shown in FIG. 5 as pattern data. In FIG. 6, Ne'i and Accp'i are used to indicate particular values of Ne and Accp'i. The quasi stroke of the accelerator pedal is the stroke of the accelerator pedal which is apparently recognized by the CPU 30 and is not therefore an actual stroke of the accelerator pedal. After the quasi stroke Accp'i of the accelerator pedal is obtained, the amount of fuel to be injected is obtained using the meet speed Ne'i and the quasi stroke Accp'i. This amount of fuel, which is expressed in terms of Q, may be derived using a pattern data prestored in the ROM 35. For instance, all-speed governor pattern shown in FIG. 6 may be used as such a pattern. The fuel injection amount Q is used to control the fuel metering actuator 11. In the case of executing the step 400 after the step 310, the fuel injection amount Q is reduced to reduce the engine speed Ne so that the engine speed Ne equals the meet speed Ne' even though the exhaust brake 41 is not kept closed.

Turning back to the step 300, if the engine speed Ne is lower than the meet speed Ne', the engine speed control is performed with only the adjustment of the fuel amount by the step 400. In this case, the fuel is increased to increase the engine speed Ne so as to match the engine speed Ne to the meet speed Ne'.

Figure 4:
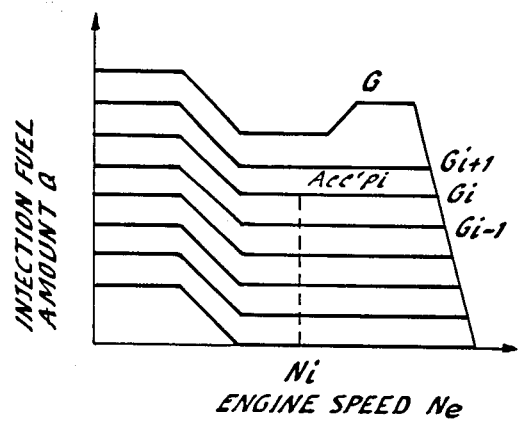
FIGS. 4 through 6 are graphs showing pattern data which are used on the execution of the program of FIG. 3.

The above-described operation is performed for establishing speed matching or synchronization between the engine speed Ne and the meet speed Ne' during gear change. After gear change, engine speed Ne is controlled by controlling the fuel injection amount Q in accordance with high and low speed governor pattern shown in FIG. 4. This normal engine speed control performed when gear change is not being made, is executed by a step 500. In FIG. 4, the reference G represents a characteristic curve of fuel injection amount Q corresponding to 100% of the stroke of the accelerator pedal, and Gi represent a one of a plurality of such characteristic curves provided for a given stroke Acc'pi of the accelerator pedal.

As described in the above, according to the present invention since the engine speed Ne is reduced by way of exhaust brake, the engine speed Ne can be made equal to the meet speed Ne' quickly. It is to be noted that the exhaust braking is performed only during gear change, and therefore, braking force is applied to the engine 2 only without decerelating the vehicle speed since the clutch 3 is in disengaged state. Furthermore, since fuel injection amount Q is controlled in accordance with the governor pattern of FIG. 6 during gear change and in accordance with the normal governor pattern of FIG. 4 after gear change, smooth gear change is made possible.

Although FIG. 4 shows a high and low speed governor pattern, the all speed govenor pattern of FIG. 6 may be used for normal engine speed control. A gear change indicator may be added to the embodiment for advising the vehicle driver of a gear changing state Furthermore, the flowchart of FIG. 3 may be changed such that the fuel injection amount Q is made zero temporarily during exhaust braking. Moreover, the exhaust brake flap 40 may be closed from its open state when the engine speed Ne is higher than the meet speed Ne' by a predetermined value so that the engine speed Ne is prevented from execessively dropping. In the above embodiment, although the meet speed Ne' is obtained from the vehicle speed and the gear position, i.e. from the rotational speed of the transmission output shaft and the gear ratio, the meet speed Ne' may be directly detected by providing a rotational speed sensor of electromagnetic pickup type to the rotary shaft of the clutch at its wheel side or to the input side of the transmission.

The above-described embodiment is just an example of the present invention, and therefore, it will be apparent for those skilled in the art that many modifications and variations may be made without departing from the scope of the present invention.

What is claimed is:

1. An apparatus for controlling a rotational speed of an internal combustion engine coupled via a clutch to a transmission, comprising:
   (a) first means for detecting a rotational speed of said engine;
   (b) second means for detecting a connecting and disconnecting state of said clutch;
   (c) third means for detecting parameters indicative of a rotational speed of an input shaft of said transmission, including:
      (i) fourth means for detecting a vehicle speed from a rotational speed of an output shaft of said transmission, and
      (ii) fifth means for detecting a gear position of said transmission;
   (d) exhaust brake means for selectively reducing the rotational speed of said engine when actuated;
   (e) fuel amount controlling means for controlling an amount of fuel supplied to said engine to control the rotational speed of said engine; and
   (f) computing means for: (1) detecting a gear changing state of said transmission on the basis of said clutch state detection by said second means, (2) calculating said rotational speed of said input shaft of said transmission from said parameters from said fourth and fifth means, and (3) controlling said exhaust brake means and said fuel amount controlling means in accordance with said parameters from said fourth means and fifth means so that the rotational speed of said engine detected by said first means approaches the rotational speed of said input shaft of said transmission during said gear changing state.

2. Apparatus as claimed in claim 1, wherein said exhaust brake means includes an engine brake flap installed in an exhaust pipe of said engine and wherein said computing means includes means for closing said engine brake flap when the rotational speed of said engine is higher than said rotational speed of said input shaft of said transmission.

3. Apparatus as claimed in claim 1, wherein said computing means includes means for controlling said fuel amount controlling means to decrease a fuel amount as a function of a quasi stroke of an accelerator pedal of said engine after engine braking.

4. A method of controlling a rotational speed of an internal combustion engine coupled via a clutch to a transmission, said engine being equipped with exhaust brake means and fuel amount controlling means, said method comprising the steps of:
   (a) detecting a rotational speed of said engine;
   (b) detecting a gear changing state of said transmission;
   (c) deriving a vehicle speed from a rotational speed of an output shaft of said transmission;
   (d) detecting a gear ratio of said transmission;

(e) computing a rotational speed of an input shaft of said transmission from said vehicle speed and said gear ratio; and (f) controlling said exhaust brake means and said fuel amount controlling means in accordance with said detected vehicle speed and said detected gear position on the basis of a detected gear changing state so that a detected rotational speed of said engine approaches a detected rotational speed of said input shaft of said transmission during said gear changing state.

5. A method as claimed in claim 4, wherein said step of detecting the gear changing state comprises a step of detecting a connecting and disconnecting state of said clutch.

6. A method as claimed in claim 4, wherein said step of controlling said exhaust brake means and said fuel amount controlling means comprises the steps of:

(a) operating said exhaust brake means when said detected rotational speed of said engine is higher than a detected rotational speed of said input shaft of said transmission;

(b) determining a quasi stroke of an accelerator pedal of said engine as a function of said rotational speed of said input shaft of said transmission;

(c) determining an amount of fuel to be supplied as a function of said rotational speed of said input shaft of said transmission wherein said function is determined by said quasi stroke of said accelerator; and (d) controlling the amount of fuel to be supplied to said engine in accordance with the obtained amount of fuel.

7. An apparatus for controlling a rotational speed of an internal combustion engine coupled via a clutch with a transmission, comprising:

(a) first means for detecting a rotational speed of said engine;

(b) second means for detecting a connecting and disconnecting state of said clutch;

(c) third means for determining a vehicle speed from a rotational speed of an output shaft of said transmission;

(d) fourth means for detecting a gear position of said transmission;

(e) fifth means for calculating a rotational speed of an input shaft of said transmission from the vehicle speed determined by said third means, and the gear position detected by said fourth means;

(f) fuel amount controlling means for controlling an amount of fuel supplied to said engine to control the rotational speed of said engine; and (g) sixth means for detecting a gear changing state of said transmission on the basis of said clutch state detection by said second means, and for controlling said fuel amount controlling means in accordance with said vehicle speed determined by said fourth means and said gear position detected by said fifth means so that the rotational speed of said engine detected by said first means approaches the rotational speed of said input shaft of said transmission during said gear changing state.

8. A method of controlling a rotational speed of an internal combustion engine coupled via a clutch to a transmission, said engine being equipped with fuel amount controlling means, said method comprising the steps of:

(a) detecting a rotational speed of said engine; engine;

(b) detecting a gear changing state of said transmission;

(c) determining a vehicle speed from a rotational speed of an output shaft of said transmission;

(d) detecting a gear position of said transmission;

(e) claculating a rotational speed of an input shaft of said transmission from the determined vehicle speed and gear position; and (f) controlling said fuel amount controlling means in accordance with a detected vehicle speed and a detected gear position on the basis of a detected gear changing state so that a detected rotational speed of said engine approaches a detected rotational speed of said input shaft of said transmission during said gear changing state.

* * * * *